United States Patent
Aravena

(10) Patent No.: US 11,826,224 B2
(45) Date of Patent: Nov. 28, 2023

(54) MULTI-UNIT DENTAL ASSEMBLY WITH OFF-AXIS FEATURE

(71) Applicant: Implant Direct Sybron International LLC, Thousand Oaks, CA (US)

(72) Inventor: Ines Aravena, Santa Rosa Valley, CA (US)

(73) Assignee: Implant Direct Sybron International LLC, Brea, CA (US)

( * ) Notice: Subject to any disclaimer, the term of this patent is extended or adjusted under 35 U.S.C. 154(b) by 0 days.

(21) Appl. No.: 15/895,016

(22) Filed: Feb. 13, 2018

(65) Prior Publication Data

US 2018/0280123 A1    Oct. 4, 2018

Related U.S. Application Data

(60) Provisional application No. 62/480,586, filed on Apr. 3, 2017.

(51) Int. Cl.
*A61C 8/00* (2006.01)
*A61C 13/00* (2006.01)
*A61C 13/271* (2006.01)

(52) U.S. Cl.
CPC ............ *A61C 8/0095* (2013.01); *A61C 8/005* (2013.01); *A61C 8/0022* (2013.01);
(Continued)

(58) Field of Classification Search
CPC ..... A61C 8/0095; A61C 8/0022; A61C 8/005; A61C 8/0054; A61C 8/0056; A61C 8/0053; A61C 13/0003; A61C 13/26
See application file for complete search history.

(56) References Cited

U.S. PATENT DOCUMENTS

| 5,116,225 A | 5/1992 | Riera |
|---|---|---|
| 5,180,303 A | 1/1993 | Hornburg et al. |

(Continued)

FOREIGN PATENT DOCUMENTS

| CA | 2920441 A1 | 3/2015 |
|---|---|---|
| EP | 1419746 A2 | 5/2004 |

(Continued)

OTHER PUBLICATIONS

Wadhwani, C. et al., An Esthetic Solution to the Screw-Retained Implant Restoration: Introduction to the Implant Crown Adhesive Plug: Clinical Report, Journal of Esthetic and Restorative Dentistry, Jun. 2011, vol. 138, No. 3, pp. 138-143, retrieved Nov. 19, 2016 from http://onlinelibrary.wiley.com/wol1/doi/10.111/j.1708-8240.2011.00423.x/full>.

(Continued)

*Primary Examiner* — Cris L. Rodriguez
*Assistant Examiner* — Drew S Folgmann
(74) *Attorney, Agent, or Firm* — Wood Herron & Evans LLP

(57) ABSTRACT

A dental assembly includes a prosthesis having a base and a plurality of artificial teeth, and at least one connecting element coupled to the prosthesis and configured to facilitate coupling of the dental assembly to a patient's oral cavity. The at least one connecting element includes a cylinder with a body having a first end, a second end, and a passageway extending between the first and second ends. The connecting element further includes an opening through a sidewall of the cylinder that is open to the passageway. The slot allows access to a fixation screw positioned in the cylinder from a direction that is angled relative to an axis of the cylinder. A method of making a dental assembly is also disclosed.

25 Claims, 11 Drawing Sheets

(52) U.S. Cl.
CPC .......... *A61C 8/0054* (2013.01); *A61C 8/0056* (2013.01); *A61C 13/0003* (2013.01); *A61C 13/26* (2013.01); *A61C 8/0053* (2013.01)

(56) References Cited

U.S. PATENT DOCUMENTS

| | | | |
|---|---|---|---|
| 5,302,126 | A | 4/1994 | Wimmer et al. |
| 5,316,477 | A | 5/1994 | Calderon |
| 5,362,235 | A | 11/1994 | Daftary |
| 5,427,906 | A | 6/1995 | Hansen |
| 5,571,016 | A | 11/1996 | Ingber et al. |
| 5,577,912 | A | 11/1996 | Prins |
| 5,662,474 | A | 9/1997 | Jorneus et al. |
| 5,667,384 | A | 9/1997 | Sutter et al. |
| 5,733,122 | A | 3/1998 | Gordon |
| 5,762,500 | A | 6/1998 | Lazarof |
| 5,873,721 | A | 2/1999 | Willoughby |
| D413,383 | S | 8/1999 | Vryonis et al. |
| 5,947,733 | A | 9/1999 | Sutter et al. |
| 5,989,029 | A | 11/1999 | Osorio et al. |
| 6,012,923 | A | 1/2000 | Bassett et al. |
| 6,126,445 | A | 10/2000 | Willoughby |
| 6,142,782 | A | 11/2000 | Lazarof |
| 6,159,010 | A | 12/2000 | Rogers et al. |
| 6,244,867 | B1 * | 6/2001 | Aravena ............... A61C 8/0066 433/172 |
| 6,287,115 | B1 | 9/2001 | Lustig et al. |
| 6,500,003 | B2 | 12/2002 | Nichinonni |
| 6,663,387 | B2 | 12/2003 | Riley |
| 6,663,390 | B2 | 12/2003 | Riley et al. |
| 6,848,908 | B2 | 2/2005 | Bjorn et al. |
| 6,994,547 | B1 | 2/2006 | Sethi et al. |
| 7,014,464 | B2 | 3/2006 | Niznick |
| 7,338,286 | B2 | 3/2008 | Porter et al. |
| 7,901,209 | B2 | 3/2011 | Saliger et al. |
| D641,877 | S | 7/2011 | Aldecoa |
| 7,988,449 | B2 | 8/2011 | Amber et al. |
| 8,597,023 | B2 | 12/2013 | Zipprich et al. |
| 8,764,445 | B1 * | 7/2014 | DeLuca ............... A61C 8/0081 433/173 |
| 9,333,057 | B2 | 5/2016 | Benzon |
| 9,408,678 | B2 * | 8/2016 | Harrison ............... A61C 1/085 |
| 9,522,051 | B2 | 12/2016 | Engman |
| 10,130,447 | B2 | 11/2018 | Xam-Mar Mangrane |
| 10,149,741 | B2 | 12/2018 | Haus et al. |
| 2001/0053512 | A1 | 12/2001 | Nichinonni |
| 2001/0055743 | A1 | 12/2001 | Yeung |
| 2003/0162149 | A1 | 8/2003 | Bjorn et al. |
| 2004/0243126 | A1 | 12/2004 | Carbone et al. |
| 2005/0084819 | A1 | 4/2005 | Sims et al. |
| 2006/0110706 | A1 | 5/2006 | Jorneus et al. |
| 2007/0154864 | A1 | 7/2007 | Deer et al. |
| 2008/0233537 | A1 | 9/2008 | Amber et al. |
| 2008/0311544 | A1 | 12/2008 | Lee |
| 2009/0087817 | A1 | 4/2009 | Jansen et al. |
| 2009/0117520 | A1 | 5/2009 | Kikuchi |
| 2009/0246734 | A1 | 10/2009 | Bar Shalom |
| 2009/0298013 | A1 | 12/2009 | Baruc |
| 2010/0268286 | A1 * | 10/2010 | Augthun ............... A61C 8/005 606/86 R |
| 2012/0237899 | A1 | 9/2012 | Holmstrom et al. |
| 2012/0286440 | A1 | 11/2012 | Jang |
| 2012/0322030 | A1 | 12/2012 | Fromovich |
| 2013/0209958 | A1 | 8/2013 | Benz et al. |
| 2014/0205969 | A1 * | 7/2014 | Marlin ............... A61B 6/145 433/173 |
| 2015/0313690 | A1 | 11/2015 | Elsner |
| 2016/0081772 | A1 | 3/2016 | Schweiger |
| 2016/0213450 | A1 | 7/2016 | Xam-Mar Mangrane |
| 2016/0242877 | A1 * | 8/2016 | Bernhard ............ A61C 13/0018 |
| 2017/0086952 | A1 | 3/2017 | Aravena |

FOREIGN PATENT DOCUMENTS

| | | |
|---|---|---|
| EP | 2127612 A1 | 12/2009 |
| KR | 101554422 B1 | 9/2015 |
| WO | 9714271 A1 | 4/1997 |
| WO | 0038588 A1 | 7/2000 |
| WO | 2001095825 A1 | 12/2001 |
| WO | 2008024062 A2 | 2/2008 |
| WO | 2008157137 A1 | 12/2008 |
| WO | 2011034781 A2 | 3/2011 |
| WO | 2012052482 A1 | 4/2012 |
| WO | 2013004387 A1 | 1/2013 |
| WO | 2014064558 A2 | 5/2014 |
| WO | 2014173539 A1 | 10/2014 |
| WO | 2014200404 A1 | 12/2014 |
| WO | 2015032831 A1 | 3/2015 |
| WO | 2015040250 A1 | 3/2015 |

OTHER PUBLICATIONS

U.S. Patent and Trademark Office, International Search Report and Written Opinion in PCT Application No. PCT/US16/54719, dated Jan. 31, 2017.
European Patent Office, Extended Search Report issued in counterpart Application No. EP16852693.7 dated Dec. 7, 2017, 7 pp.
U.S. Patent and Trademark Office, Office Action in U.S. Appl. No. 15/281,550, dated Jan. 11, 2018.
The International Bureau of Wipo, International Preliminary Report on Patentability in PCT Application Serial No. PCT/US2016/054719, dated Apr. 3, 2018.
U.S. Patent and Trademark Office, Office Action in U.S. Appl. No. 15/281,550, dated Jul. 2, 2018.
U.S. Patent and Trademark Office, Office Action in U.S. Appl. No. 15/281,550, dated Jun. 29, 2017.
U.S. Patent and Trademark Office, Office Action in U.S. Appl. No. 15/637,415, dated Dec. 28, 2018.
U.S. Patent and Trademark Office, Final Office Action in U.S. Appl. No. 15/281,550, dated Jan. 17, 2019.
European Patent Office, Office Action in EP18159889.7, dated Aug. 8, 2018.
European Patent Office, Search Report and Written Opinion in EP18159889.7, dated Aug. 8, 2018.
European Patent Office, Examination Report in corresponding European Patent Application No. 18159889.7 dated Nov. 18, 2019.
U.S. Patent and Trademark Office, Office Action issued in U.S. Appl. No. 15/637,415 dated Apr. 12, 2021.
European Patent Office, Examination Report issued in corresponding EP 18159889.7 dated Feb. 3, 2021.
European Patent Office, Notice of Opposition filed in EP 16852693.7 dated Aug. 3, 2022.
U.S. Patent and Trademark Office, Office Action issued in U.S. Appl. No. 15/281,550 dated Sep. 18, 2020.
U.S. Patent and Trademark Office, Office Action issued in corresponding U.S. Appl. No. 15/637,415, dated Jun. 9, 2020.
U.S. Patent and Trademark Office, Office Action issued in corresponding U.S. Appl. No. 15/281,550 dated Aug. 5, 2019.
U.S. Patent and Trademark Office, Office Action issued in corresponding U.S. Appl. No. 15/281,550 dated Mar. 6, 2020.
European Patent Office, Summons to Attend Oral Proceedings issued in EP 18159889.7 dated Aug. 11, 2023.
European Patent Office, Written Opinion issued in EP 18159889.7 dated Aug. 11, 2023.
European Patent Office, Office Action issued in EP 21205711.1 dated Sep. 26, 2023.
European Patent Office, Third Party Observation filed in EP 21205711.1 dated Sep. 20, 2023.

* cited by examiner

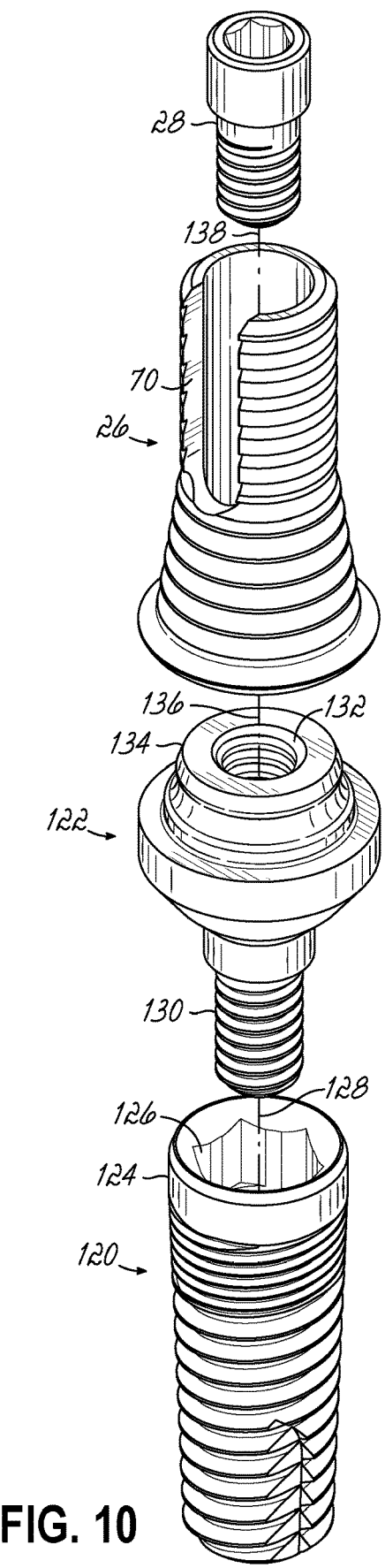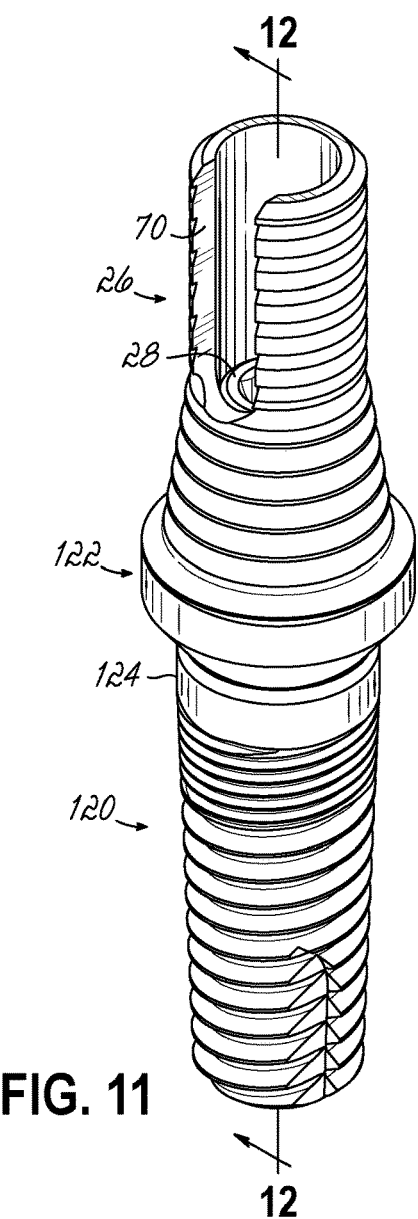
FIG. 10
FIG. 11

MULTI-UNIT DENTAL ASSEMBLY WITH OFF-AXIS FEATURE

CROSS REFERENCE TO RELATED APPLICATION

This application claims priority to U.S. Provisional Application Ser. No. 62/480,586, filed Apr. 3, 2017, the disclosure of which is incorporated by reference herein in its entirety.

TECHNICAL FIELD

The invention relates generally to dental implants, and more particularly to a multi-unit dental assembly, including a full-arch or partial-arch prosthesis, such as a denture or bridge, having a screw-receiving cylinder with an off-axis feature

BACKGROUND

Edentulism, the condition of being toothless to some extent, may be treated by the implantation of a dental assembly. These assemblies require certain components to rest comfortably and securely in the patient's oral cavity. The implant fixture, also known as the dental implant or simply the implant, is the part of the dental assembly that becomes fused with the patient's jaw bone. The implant is available in both cylinder and screw-type varieties and is typically made from titanium or a titanium alloy. Implant abutments are screwed onto the implant and are positioned at or above the patient's gum line. Finally, a dental prosthesis is placed over the abutment and is designed to look and function like a natural tooth.

In extreme cases, it may be necessary to replace multiple or potentially all of the teeth on the maxillary or mandibular jaw. In this case, the dental assembly may include a multi-unit prosthesis, such as a bridge or denture having multiple artificial teeth, which is coupled to the oral cavity using multiple implants. FIG. 1 illustrates a conventional approach for securing a multi-unit dental assembly, such as denture 10, to a patient. In this case, multiple implants 12 are positioned in the patient's jaw. In this case, a four implant 12a-12d dental assembly is shown, but the number of implants may vary. The implants 12b, 12c in the anterior of the mouth may be positioned in the patient's gums in a generally straight line manner such that the long axis of the implant is generally perpendicular to a plane defined by the gum line. However, and as illustrated in FIG. 1, in many cases the implants 12a, 12d in the posterior of the mouth are angled in order to improve bone-to-implant integration, avoid expensive bone augmentation, and to avoid contacting vital nerves.

Further, as is well known in the industry, abutments 14a-14d are then coupled to the implants 12a-12d, typically with a fixation screw 16, to facilitate a coupling between the prosthesis and the implant. For the anterior region, the abutments 14b, 14c are generally straight forward in their design and include an axis that is generally parallel to the long axis of the implants 12b, 12c. The abutments 14a, 14d for the posterior region, however, are more complex due to the angling of the implants 12a, 12d in the patient's gums. In this regard, the abutments 14a, 14d are designed to alter the angle at which the prosthesis is ultimately coupled to the implant. More particularly, due to the angling of the implant in the posterior region, it is typically very difficult for a dental practitioner to insert a fixation screw into a straight-on abutment (such as that used in the anterior region) for securing the prosthesis to the implants. For this reason, the posterior abutments typically have an angled, dual axis design. The first axis generally aligns with the long axis of the implant. A first fixation screw 16 is then used to couple the abutment to the implant. The second axis is angled relative to the first axis and is configured to be generally perpendicular to the gum line plane, similar to the anterior abutments. In this way, the collection of abutments 14a-14d defines a generally parallel platform for receiving the denture 10. To this end, the denture 10 includes a number of cylinders incorporated into the denture 10 that defines a screw-access channel for the passage of a fixation screw 18 for securing the denture 10 to the abutments 14a-14d. Because the posterior abutments 14a, 14d have the dual angle feature, the coupling of the denture 10 via the fixation screws 18 is somewhat improved.

While the conventional approach has been generally successful for its intended purposes, there are some drawbacks to the current approach. In this regard, the abutments require a complicated manufacturing process to provide the angulated feature, and thus are relatively costly. As a result, angled abutments are typically provided in only a few pre-selected angles. In this regard, current abutments are constrained to operate with either 15 degree or 30 degree angled implants. In other words, the implants must be placed in the gums at either 15 degrees or 30 degrees, which can be limiting in some instances. Moreover, the design requires an additional fixation screw, which increases the cost and provides another site for screw-loosening complications. As noted above, sometimes it can be difficult for a medical practitioner to couple the posterior abutments to the angled implants. This has prompted some manufacturers to provide a special carrier or holder to facilitate the coupling of the abutment to the implant. Furthermore, in the conventional approach outlined above, the diameter of the cylinders that define the screw-access channel must be large enough to allow the fixation screw to pass therethough. However, as the diameter of the channel increases, the strength of the prosthesis becomes more compromised. For this reason, the cylinders are typically located lingually of the biting plane of the teeth. This generates large moment forces on the denture, which can result in loosening of the dental assembly or breakage.

For the reasons outlined above, there is a need for a dental assembly that addresses the present challenges and drawbacks. More particularly, there is a need to a multi-unit dental assembly that may be coupled to a patient's oral cavity in an improved manner.

SUMMARY

To these and other ends, a dental assembly includes a prosthesis having a base and a plurality of artificial teeth, and at least one connecting element coupled to the prosthesis and configured to facilitate coupling of the dental assembly to a patient's oral cavity. The at least one connecting element includes a cylinder with a body having a first end, a second end, and a passageway extending between the first and second ends. The connecting element further includes a opening through a sidewall of the cylinder that is open to the passageway.

The dental assembly may be configured as a denture or a bridge in various embodiments. The prosthesis defines a gingival side and an occlusal side, an anterior region, and a posterior region. The at least one connecting element may be positioned in the posterior region of the prosthesis. The second end of the connecting element may be open to the gingival side of the prosthesis and the first end may be buried within the prosthesis so as not to be readily accessible from the occlusal side. However, the prosthesis may include an access channel through the base and/or one or more of the teeth so as to be open to the occlusal side of the prosthesis and open to the passageway of the connecting element. More particularly, the access channel may extend through the opening in the sidewall of the connecting element. In an advantageous aspect, the connecting element defines a cylinder axis and the access channel defines a channel axis, wherein the cylinder axis and the channel axis are in non-parallel relation to each other to define an acute angle therebetween. This angle may be between about 5 degrees and about 25 degrees. The access channel in one embodiment may have a cross dimension less than a cross dimension of the passageway of the connecting element, and less than a diameter of a fixation screw that is received in the passageway of the connecting element. The fixation screw may be encased within the dental assembly so as to be inseparable therefrom. However, the fixation screw is configured to have a limited amount of travel within the connecting element.

In an exemplary embodiment, the cylinder body includes an outer surface wherein at least a portion of the outer surface includes perturbations to facilitate retention of the connecting element to the prosthesis. The perturbations may include saw-tooth channels that define undercuts, for example. The entirety of the outer surface may include the perturbations or only a select portion thereof, such as a portion adjacent the second end of the connecting element. The outer surface may have a tapered configuration, a straight configuration, or a combination thereof. Moreover, the outer surface may include an annular groove between the first and second ends. The annular groove may be positioned between about 20% and about 50% of the length of the connecting element from the second end. The passageway defines an inner wall from which an annular lip may project. This defines a first cavity and a second cavity on opposite sides of the annular lip. The inner wall may have a tapered configuration, a straight configuration, or a combination thereof. For example, the second cavity may be tapered while the first cavity may be straight. The opening, which may be a slot, may be open to the first end of the connecting element and extending in a direction generally parallel to the cylinder axis. The slot length may be between about 20% and about 70% of the length of the connecting element. The slot width may be between about 30 degrees and about 60 degrees of a circumference of the connecting element. A flat may be formed on the outer surface of the connecting element for alignment and orientation purposes during manufacturing. Additionally, the second end of the connecting element may include an outwardly extending flange to facilitate seating of the connecting element on or within the prosthesis.

In another embodiment, a connecting element for use in a multi-unit dental assembly includes a cylinder body having a first end, a second end, and a sidewall; a passageway extending between the first and second ends; and an opening through the sidewall of the cylinder body that is open to the passageway.

In yet another embodiment, a method of making a dental assembly includes forming a prosthesis having a base and a plurality of artificial teeth, and coupling at least one connecting element to the prosthesis, wherein the at least one connecting element includes a cylinder with a body having a first end, a second end, and a passageway extending between the first and second ends, the connecting element further comprising an opening through a sidewall of the cylinder that is open to the passageway. In an exemplary method, a digital workflow procedure may be used to make the dental assembly. In this regard, the method may further include providing data representing a digital scan of a patient's oral cavity; importing the data into a software program on a computer; generating a computer model of the prosthesis using the software; and manufacturing the prosthesis using the computer model. Using the software, the computer model of the prosthesis may be generated with bores that are delineated by an internal boundary. The bores are configured to receive a connecting element upon the formation of the prosthesis. More particularly, the software program may include at least two libraries that provide the internal boundary of bores with different heights. In this way, the prosthetic designer may select from the two libraries such that the bores formed in the manufactured prosthesis are sized to receive a cylinder having the selected height.

In a further embodiment, a method of making a dental assembly includes forming a prosthesis having a base and a plurality of replacement teeth, the prosthesis having at least one bore configured to receive a connecting element having a first size and at least one bore configured to receive a connecting element having a second size different from the first size; providing a plurality of connecting elements, each connecting element corresponding to the first size, each connecting element further including a groove, wherein a connecting element separated at the groove results in the connecting element having the second size; separating one or more of the plurality of connecting elements at the groove; securing a connecting element having the first size to the at least one bore in the prosthesis corresponding to the first size; and securing a connecting element having the second size to the at least one bore in the prosthesis corresponding to the second size. In an exemplary method, a digital workflow procedure may be used to make the dental assembly. Similar to the above, the method may further include providing data representing a digital scan of a patient's oral cavity; importing the data into a software program on a computer; generating a computer model of the prosthesis using the software; and manufacturing the prosthesis using the computer model.

In another embodiment, a method of making a dental assembly includes forming a prosthesis having at least one replacement tooth, the prosthesis having at least one bore configured to receive an abutment having a first size or a second size different from the first size; providing an abutment having a size corresponding to the first size, each abutment having a demarcation line, wherein an abutment separated at the demarcation line results in the abutment having the second size; and determining the size of the at least one bore in the prosthesis. If the at least one bore in the prosthesis is determined to be of the first size, the method further includes securing an abutment to the at least one bore without modifying the abutment. If the at least one abutment is determined to be of the second size, the method further includes separating the abutment at the demarcation line, and securing the abutment to the at least one bore in the prosthesis.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 10 is a disassembled perspective view illustrating the coupling of a dental assembly with an implant in a bone level application and with the use of an abutment;

FIG. 11 is an assembled view of that shown in FIG. 10;

DETAILED DESCRIPTION

Figure 1:
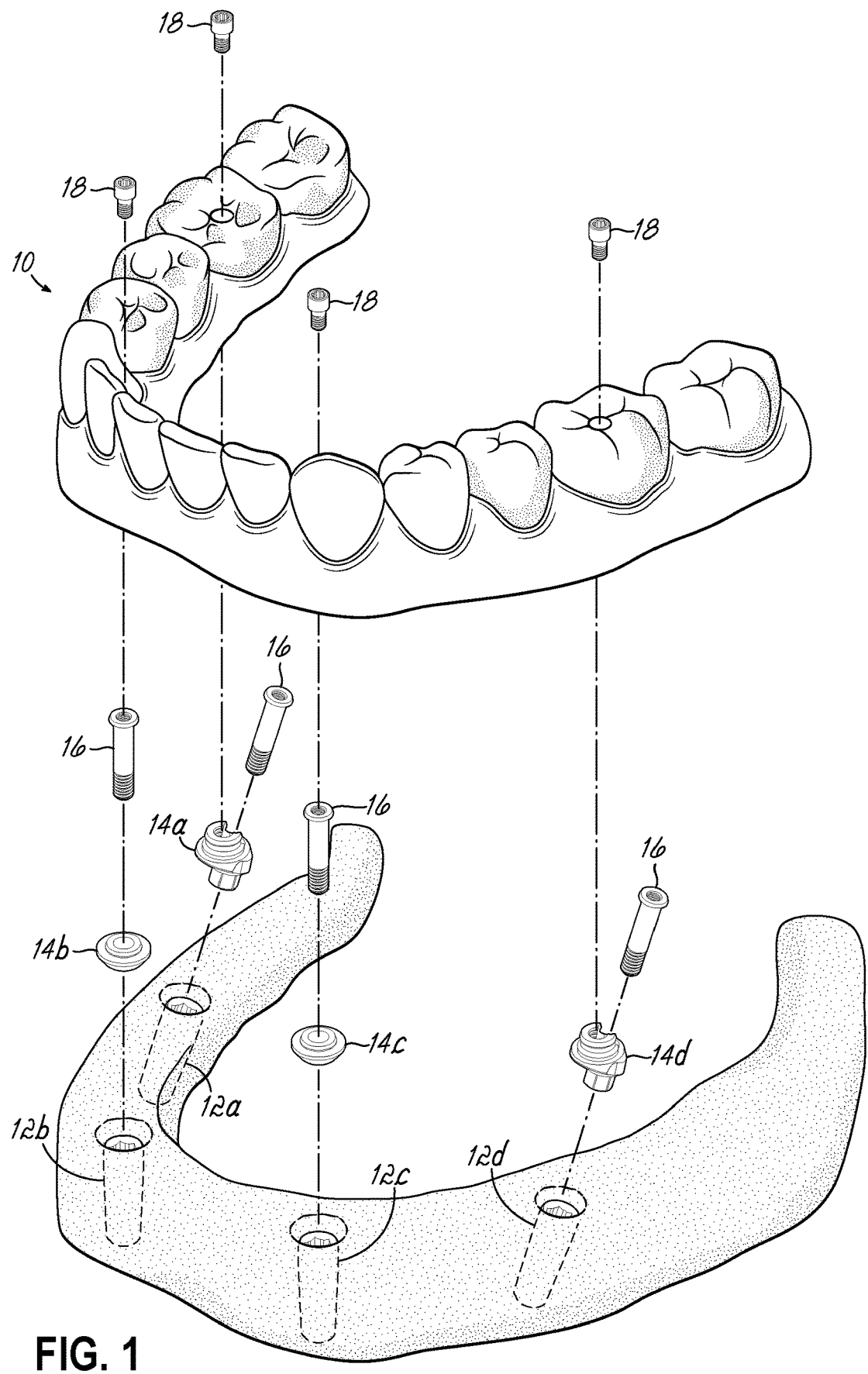
FIG. 1 illustrates a conventional approach to coupling a denture to the oral cavity of a patient.
Figure 2:
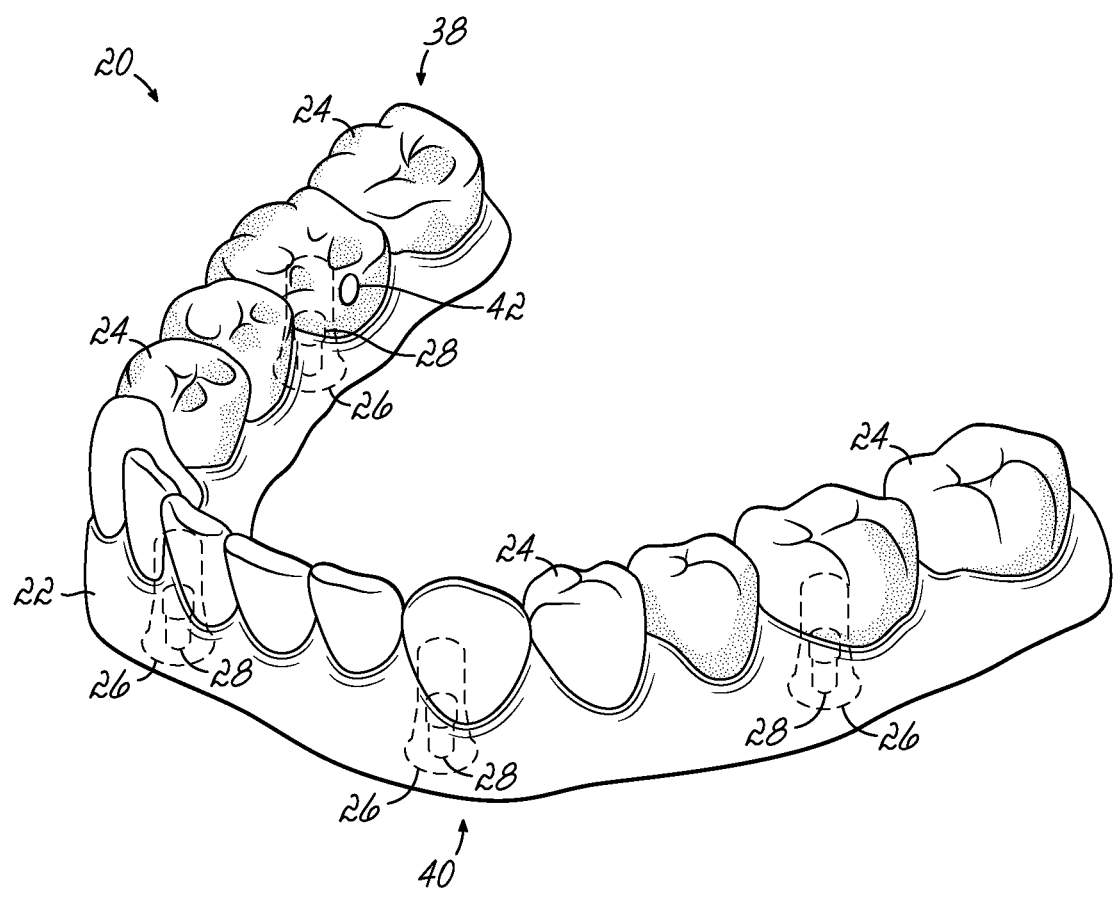
FIG. 2 illustrates a dental assembly having a connecting element in accordance with an embodiment of the invention.
Figure 3:
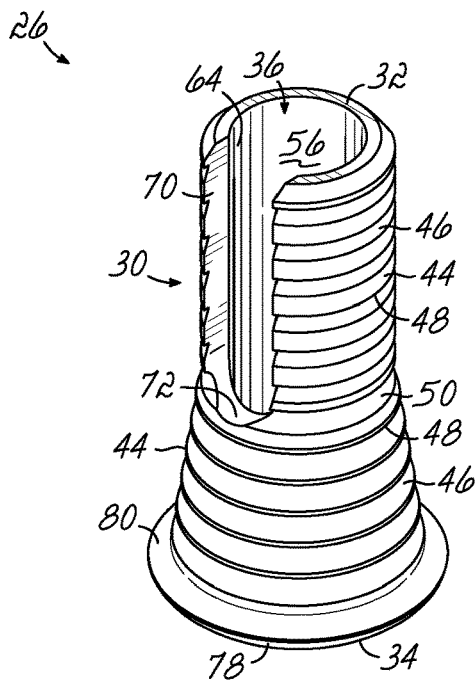
FIG. 3 illustrates a perspective view of a connecting element in accordance with an embodiment of the invention.
Figure 4:
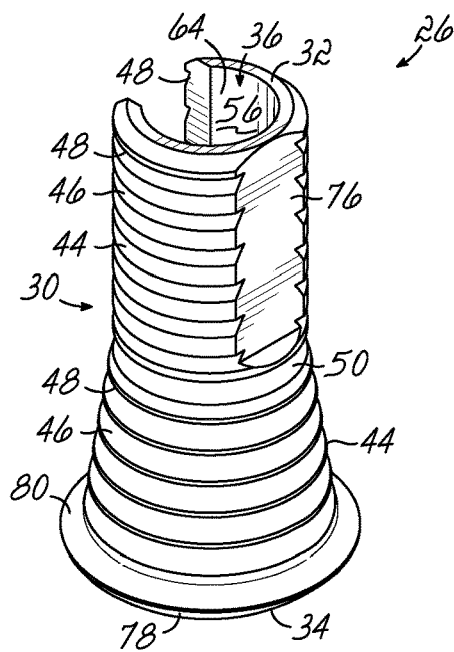
FIG. 4 illustrates another perspective view of the connecting element shown in FIG. 3.

FIG. 2 illustrates a multi-unit dental assembly 20 in accordance with an embodiment of the invention. Without being limited to a particular arrangement, the multi-unit dental assembly 20 may be a fixed, full-arch or partial-arch prosthesis, such as a full-arch denture or a bridge. The multi-unit dental assembly 20 typically includes a prosthesis having a gum-colored base 22 made of acrylic resin or similar materials and a plurality of artificial teeth 24 made of porcelain, plastic or other suitable materials as is known in the art, and at least one, and preferably a plurality of, connecting elements 26 coupled (e.g., permanently bonded) with the base 22 and/or the teeth 24 to facilitate coupling of the dental assembly 20 to the oral cavity of a patient's mouth. For example, the dental assembly 20 may be configured to be coupled to a plurality of implants 12, with or without abutments 14 coupled thereto, pre-positioned in the oral cavity. The connecting elements 26 are configured to receive a fastener, such as a fixation screw 28, for securing the dental assembly 20 to the implants 12 in the oral cavity. The connecting elements 26 that form part of the dental assembly 20 is, in the field of dentures, referred to as a cylinder. Thus the term cylinder as used herein may refer to a connecting element 26 that forms a permanent part of the dental assembly 20 and which is configured to receive a fixation screw 28 for securing the dental assembly to the implants 12 or abutments 14 in the oral cavity. Aspects of the present invention are directed to an improved cylinder 26 for use in multi-unit dental assemblies which have an off-axis feature. In this regard, the cylinders 26 in accordance with an aspect of the invention provide an improved way for dental practitioners to secure the dental assembly 20 to the oral cavity.

A cylinder 26 in accordance with an embodiment of the invention is illustrated in FIGS. 3-6. The cylinder 26 includes a generally cylindrical body 30 having a first end 32, a second end 34, and a passageway 36 extending between the first and second ends 32, 34. When the cylinder 26 is coupled to the dental assembly 20, the first end 32 is adjacent an occlusal side 38 of the dental assembly 20 and the second end 34 is adjacent a gingival side 40 of the dental assembly 20. In this regard, the second end 34 of the cylinder 26 may be open to the gingival side 40 of the dental assembly 20 such that the passageway 36 is accessible from the gingival side 40. For example, the second end 34 may be substantially flush with the base surface on the gingival side 40 of the dental assembly 20. Alternatively, the second end 34 may be slightly recessed below the base surface or project slightly above the base surface on the gingival side of the dental assembly 20. In one exemplary embodiment, the first end 32 of the cylinder 26 may be essentially buried within the dental assembly 20, i.e., either within the base 22 and/or a tooth 24, and only accessible through an access channel 42 extending from the occlusal side 38 of the dental assembly 20 (see FIG. 9). Thus, the cylinder 26 does not extend completely through the dental assembly 20. This will be explained in more detail below.

In an exemplary embodiment, at least a portion of the outer surface 44 of the cylindrical body 30 includes perturbations that facilitate the coupling of the cylinders 26 to the base 22 and/or teeth 24 as described above. By way of example and without limitation, in one embodiment, the outer surface 44 of the cylindrical body 30 may include one or more saw-tooth annular channels 46 that define undercuts 48. The annular channels 46 may be provided for the entire length of the cylinder 26, or alternatively may be provided for only a portion of the length of the cylinder 26, such as adjacent the second end 34 of the cylinder 26. In addition, the outer surface 44 of the cylindrical body 30 may include an annular groove 50 located between the first and second ends 32, 24 so as to define a first portion 52 (e.g., an occlusal portion) and a second portion 54 (e.g., a gingival portion) separated by the annular groove 50. In this regard, the cylinder 26 may be used in different orthodontic applications where the occlusal portion 52 of the cylinder 26 may not be necessary, and therefore may be removed by a technician or the like using a grinding wheel or similar device. In this regard, the annular groove 50 provides a visual indicator of how much of the cylinder 24 should be removed in order to use the remaining portion of the cylinder in a prosthetic application. In this way, the cylinder 26 may be transformed quickly and easily for use in different applications requiring a cylinder. The groove 50 may be positioned from the second end 34 between about 20% and about 50% of the length of the cylinder 26. In an exemplary embodiment and without limitation, the length of the cylinder may be about 9 mm and the annular groove 50 may be positioned at about 4 mm from the second end 34 of the cylinder 26. It should be recognized, however, that the total length of the cylinder 26 and the relative position of the annular groove 50 may be varied to meet the needs of a particular application. By way of example, a dental assembly in one embodiment may include one or more cylinders having a full height (such as in the posterior of the oral cavity), and one or more cylinders having a reduced height (such as in the anterior of the oral cavity). For the reduced height cylinders, a technician may simply cut or otherwise separate a cylinder 26 at the groove 50 so as to be at the reduced height.

Figure 5:
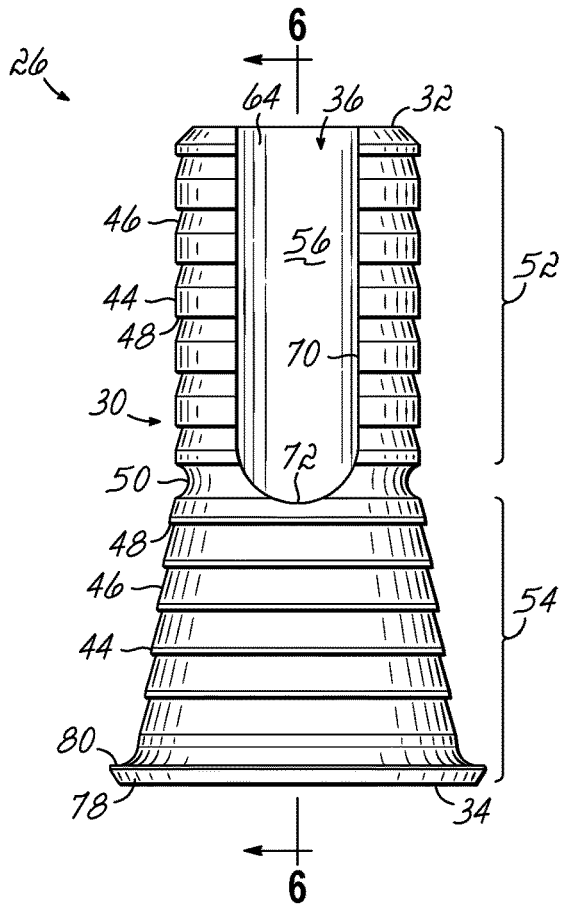
FIG. 5 is a side plan view of the connecting element shown in FIG. 3 illustrating the slot.
Figure 6:
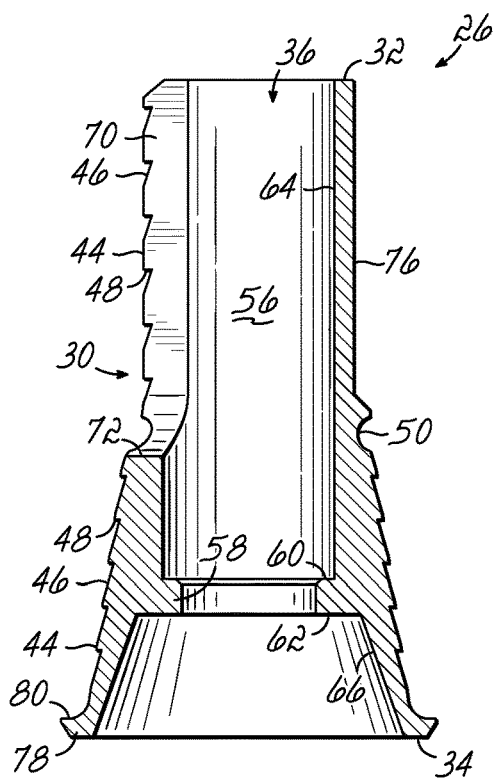
FIG. 6 is a cross-sectional view of the connecting element shown in FIG. 5 taken along the line 6-6.

In various embodiments the outside surface 44 of the cylinder 26 may have a straight configuration, a tapered configuration, or a combination of the two configurations. As best illustrated in FIGS. 5 and 6, in an exemplary embodiment, the outside surface 44 of the cylinder 26 may have a generally tapered configuration from the second end 34 to the annular groove 50, where the diameter of the cylinder 26 is greatest at the second end 34 and decreases in a direction toward the groove 50. Moreover, in an exemplary embodiment, the diameter of the cylinder 26 (e.g., the outermost diameter) may be substantially constant from the annular groove 50 to the first end 32 of the cylinder 26. It should be recognized, however, that in alternative embodiments, the outer surface 44 may be tapered or straight substantially along the entire length of the cylinder 26 and the invention should not be limited to any particular configuration for the outer surface 44.

Turning now to the passageway 36 of the cylinder 26, the passageway 36 is defined by an inner wall 56 extending between the first and second ends 32, 34. The passageway 36 includes an annular lip 58 extending radially inward of the inner wall 56 between the first and second ends 32, 34 to define a first ledge or surface 60 (e.g., an occlusally-facing ledge) and a second ledge or surface 62 (e.g., a gingivally-facing ledge). Accordingly, the annular lip 58 defines a first cavity 64 (e.g., an occlusal cavity) and a second cavity 66 (e.g., a gingival cavity). The annular lip 58 may be located along the length of the cylinder 26 so as to be closer to the second end 34 than the first end 32. By way of example, the annular lip 58 may be located between about 10% and about 45% of the length of the cylinder 26 from the second end 34. As explained in more detail below, the first cavity 64 is configured to receive the fixation screw 28 (e.g., the head of the fixation screw 28) and the second cavity 66 is configured to receive a portion of an implant 12 or a portion of an abutment 14 and to which the dental assembly 20 is secured. In an exemplary embodiment, the inner wall 56 along the second cavity 66 may be slightly tapered, where the inner diameter of the passageway 36 is greatest at the second end 34 and decreases in a direction toward the annular lip 58. Furthermore, the diameter of the inner wall 56 along the first cavity 64 may be substantially constant. In various alternative embodiments, however, the inner wall 56 may have different configurations along the first and second portions 64, 66 and remain within the scope of the present invention. For example and without limitation, the inner wall 56 along both the first and second portions 64, 66 may have a straight or tapered configuration.

In accordance with an aspect of the invention, the cylinders 26 of the dental assembly 20 may include an opening, such as a slot 70, through the sidewall of the cylinder 26 from the outer surface 44 to the inner wall 56 of the passageway 36. For example, the cylinders 26 corresponding to the posterior implants 12a, 12d may include such a slot 70. In any event, the slot 70 is open to the first end 32 of the cylinder 26 and extends in a direction parallel to the axis of the cylinder 26 toward the second end 34, but stops short of the second end 34. The terminating end 72 of the slot 70 may have a generally arcuate configuration so as to avoid corners and stress concentrations. The slot 70 may have a length from the first end 32 between about 20% and about 70% of the length of the cylinder 26. Of course the length of the slot 70 may vary depending on the application and/or desires of the dental practitioner. In one exemplary embodiment, for example, the slot 70 may extend from the first end 32 and terminate at the annular groove 50 formed in the outer surface 44 of the cylinder 26. Thus, should the cylinder 26 be trimmed at the groove 50 for use in other applications, the slot 70 would not be present in the remaining part of the cylinder. The slot 70 also includes a width (e.g., in a circumferential direction of the cylinder 26). Ideally and as explained in more detail below, the width of the slot 70 is dictated by the diameter of the access tool or driver 74 used to access the fixation screw 28 that resides in the cylinder 26. In an exemplary embodiment, however, the width of the slot may be between about 30 degrees and about 60 degrees of the circumference of the cylinder 26. In any event, the diameter of the tool or driver 74 may be less than the largest diameter of the fixation screw 28.

As illustrated in the figures, the outer surface 44 of the cylinder 26 may additionally include a flat 76. The flat 76 may operate as an anti-rotational feature. Furthermore, the flat 76 may operate as an orientation marker during the manufacturing process of the dental assembly 20 having the cylinders 26 incorporated therewith. In addition, the second end 34 of the cylinder 26 may include a radially-outwardly extending flange 78 defining a shoulder 80. The flange 78 facilitates seating of the cylinder 26 within or on the dental assembly 20.

The dental assembly 20 may be made through two main steps. First, conventional or digital processes may be used to design the dental assembly, which will be unique to each patient and application. Then, the dental assembly may be manufactured either via conventional manufacturing techniques modified to include the driver access channel 42 or through computer-aided manufacturing techniques also modified to include the driver access channel 42. Additional details of these processes are disclosed in co-owned U.S. application Ser. No. 15/281,550, the disclosure of which is incorporated by reference herein in its entirety. By way of example, in an exemplary embodiment the dental assembly 20 may be formed using a digital workflow procedure. First, a dental professional conducts an intro-oral or impression scan using digital impression techniques. The data thus generated is imported into software that determines a number of features, including implant design, abutment design (if any), and cylinder design. The software also designs the prosthesis including the desired off-axis access channel. The prosthesis is fabricated following computer-aided manufacturing procedures. In this regard, an exemplary computer-aided manufacturing process using a 3SHAPE® CAD/CAM system may be used. The data obtained from either an intra-oral or impression scan of the patient's oral cavity are imported into the CAD system. Then, a computer model of the implants 12, the abutments 14 (if any), and the cylinders 26 having a slot 70 in its sidewall, is combined with a computer model of a prosthesis. When designing the dental assembly 20 digitally in the software, the height of the cylinder may be appropriately selected depending on the application. As noted above, the cylinder 26 includes a groove 50 that selectively provides two heights of the cylinder 26 during use. The software may include a library for each of the possible heights of the cylinder 26 (two in this case). The libraries that form part of the software then define the internal boundaries of a bore that is made during manufacturing of the prosthesis such that when the prosthesis is completed, the bores formed therein are configured to receive cylinders 26 with the selected height. If the prosthesis is designed to have a bore with internal boundaries configured to receive a cylinder of a reduced height, then once the prosthesis is made according to the design, a technician may cut or otherwise separate a cylinder 26 at the groove 50 to thereby provide a cylinder that corresponds to the internal boundaries of the bore(s) formed in the prosthesis. The technician may then secure the reduced height cylinder within the respective bore(s) in the prosthesis, through bonding for example, to form the dental assembly.

In one aspect, the dental assembly 20 having the cylinders 26 coupled thereto essentially enclose or incase the fixation screw 28 within the dental assembly 20 such that the fixation screw cannot become separated from dental assembly and fall, for example, into the patient's mouth. More particularly, the fixation screw 28 is prevented from passing out of the first cavity 64 in one direction (e.g., the gingival direction) due to the presence of the annular lip 58, beyond which the head of the fixation screw 28 cannot pass. In the opposite direction (e.g., the occlusal direction), the fixation screw 28 is prevented from passing out of the first cavity 64 by the presence of the base 22 and/or teeth 24 combined with the fact that the tool access channel 42 may have a diameter smaller than the head of the fixation screw 28 and therefore cannot pass through the access channel 42. Thus, the fixation screw 28 has limited travel within the cylinder so as to engage and disengage with threads associated with the implant 12 or abutment 14, but otherwise is trapped within the dental assembly 20 and cannot become separated therefrom. This allows the dental assembly 20 to be positioned within the oral cavity and coupled to the oral cavity without concern of the fixation screws falling into the patient's mouth.

Figures 7, 8:
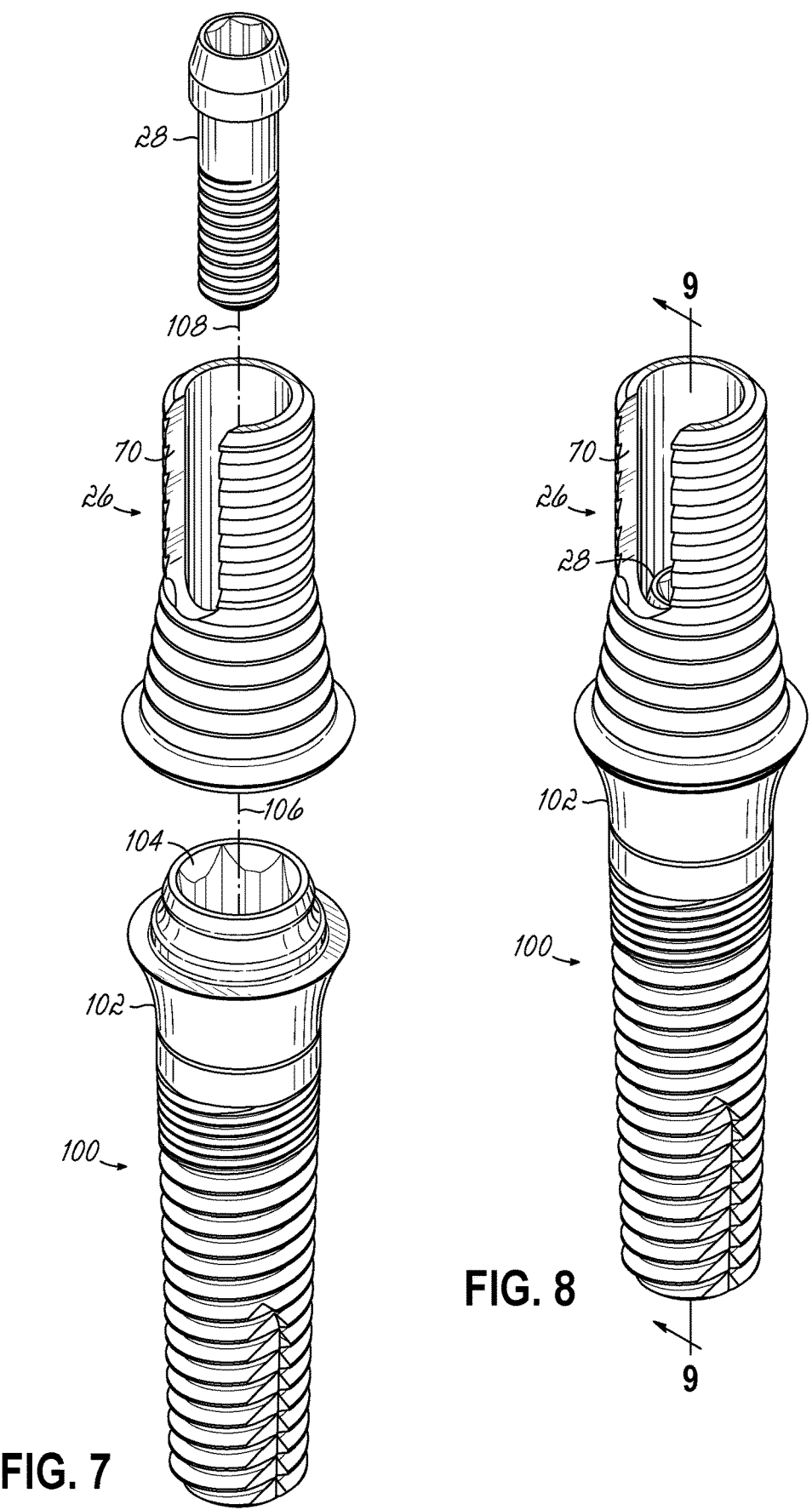
FIG. 7 is a disassembled perspective view illustrating the coupling of a dental assembly with an implant in a supra-gingival application.
FIG. 8 is an assembled view of that shown in FIG. 7.
Figure 9:
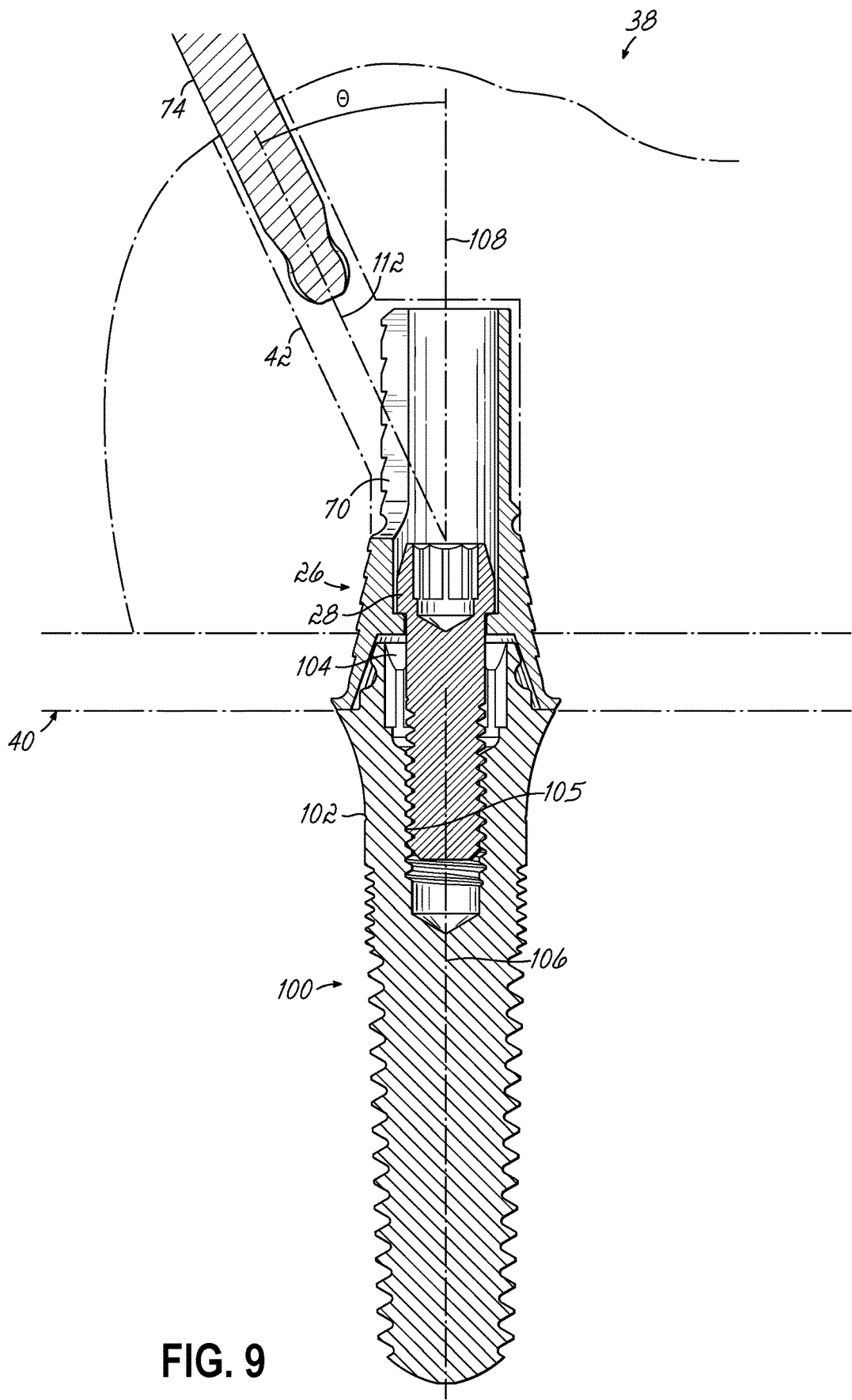
FIG. 9 is a cross-sectional view of the dental assembly shown in FIG. 8 taken along the line 9-9.

FIGS. 7-9 schematically demonstrate an exemplary use of a dental assembly 20 having a cylinder 26 with a slot 70 in a supra-gingival application. In this regard, an implant 100 is positioned within the jaw of a patient in the typical manner. The implant 100 includes a supra-gingival region 102 having a screw-receiving bore 104 with internal threads 105 configured to receive a fixation screw 28. The implant 100 may be positioned in the patient at a desired angle so as to generally define an implant axis 106. If the angle is not too large, the cylinder 26 of the dental assembly 20 may be coupled directly to the implant 100 without an intervening abutment. For sake of clarity, the cylinder 26 of the dental assembly 20 is shown without the base 22 or the teeth 24 illustrated. In any event, the cylinder 26 is positioned within the dental assembly 20 such that when the dental assembly is positioned within the oral cavity, the cylinder axis 108 is generally aligned and parallel to the implant axis 106. At this point, from the inside of the mouth and occlusal side 38 of the dental assembly 20, the dental practitioner may insert the access tool or driver 74, which may be a ball-point hex driver for example, through the access channel 42 in the dental assembly 20 so as to gain access to the first cavity 64 of the cylinder 26 where the fixation screw 28 resides. The driver 74 may be rotated so as to engage the fixation screw 28 to the internal threads in the implant 100.

As clearly demonstrated in these figures, the angle at which the driver 74 engages the fixation screw 28 does not have to be parallel to the cylinder axis 108. Due to the presence of the slot 70 in the cylinder 26, the driver 74 may engage the fixation screw 28 along an axis 112 that is angled relative to the cylinder axis 108. By way of example and without limitation, the driver axis 112 and the cylinder axis 108 may include an angle θ between approximately 5 degrees and about 25 degrees. This off-axis feature afforded by the slotted cylinder 26 makes the coupling of the dental assembly 20 to the implants in the oral cavity much easier.

Figure 12:
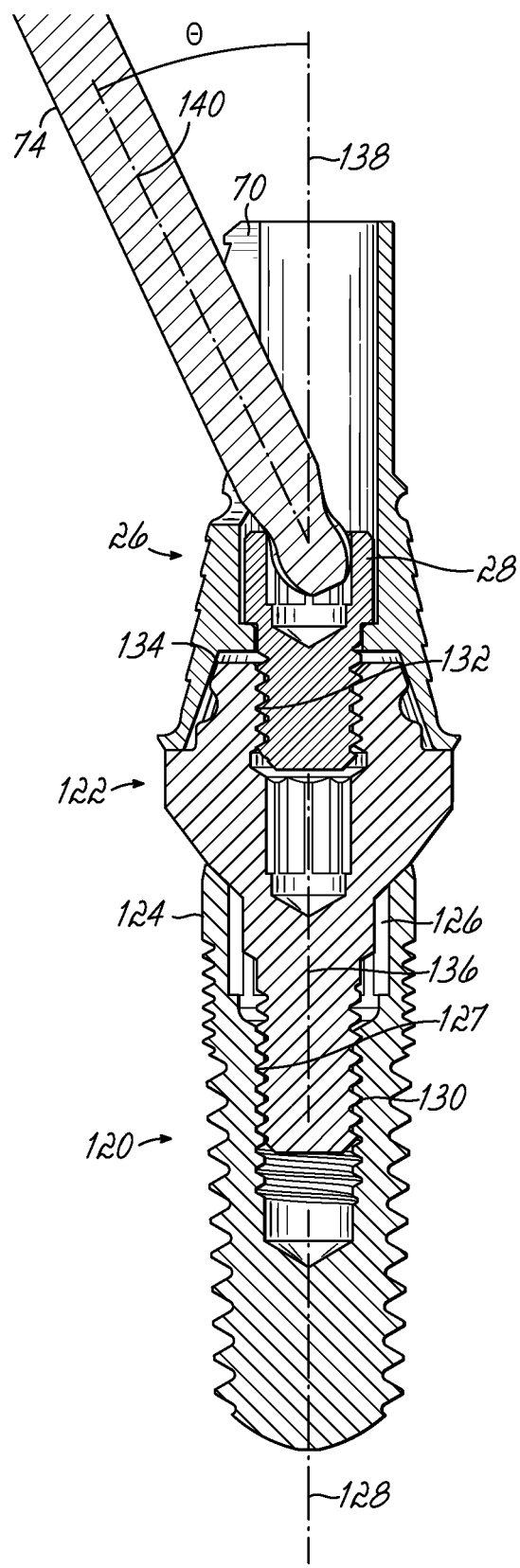
FIG. 12 is a cross-sectional view of the dental assembly shown in FIG. 11 taken along line 12-12.

FIGS. 10-12 schematically demonstrate another exemplary use of a dental assembly 20 having a cylinder 26 with a slot 70. In this application, an implant 120 is positioned within the jaw of a patient in the typical manner and an abutment 122 is used to couple the dental assembly 20 to the implant 120. The implant 120 includes a coronal region 124 having a screw-receiving bore 126 with internal threads 127 configured to receive an end of the abutment 122. The implant 120 may be positioned in the patient at a desired angle so as to generally define an implant axis 128. The abutment 122 includes a threaded end 130 configured to be received in the bore 126 of the implant and a screw-receiving bore 132 at a coronal end 134 configured to receive a fixation screw 28. The abutment 122 defines an abutment axis 136, which in this embodiment is generally parallel with the implant axis 128 when the abutment 122 is coupled to the implant 120. The cylinder 26 of the dental assembly 20 may be coupled to the abutment 122. For sake of clarity, the cylinder 26 of the dental assembly 20 is shown without the base 22 or the teeth 24 illustrated. In any event, the cylinder 26 is positioned within the dental assembly 20 such that when the dental assembly is positioned within the oral cavity, the cylinder axis 138 is generally aligned and parallel to the abutment axis 136. At this point, from the inside of the mouth and occlusal side 38 of the dental assembly 20, the dental practitioner may insert the access tool or driver 74, which may be a ball-point hex driver for example, through the access channel 42 in the dental assembly 20 so as to gain access to the first cavity 64 of the cylinder 26 where the fixation screw 28 resides. The driver 74 may be rotated so as to engage the fixation screw 28 to the internal threads in the abutment 122.

Similar to the above, the angle at which the driver 74 engages the fixation screw 28 does not have to be parallel to the cylinder axis 138. Due to the presence of the slot 70 in the cylinder 26, the driver 74 may engage the fixation screw 28 along an axis 140 that is angled relative to the abutment axis 136. By way of example and without limitation, the driver axis 140 and the abutment axis 136 may include an angle θ between approximately 5 degrees and about 25 degrees. This off-axis feature afforded by the slotted cylinder 26 makes the coupling of the dental assembly 20 to the implants in the oral cavity much easier.

Figures 13, 14:
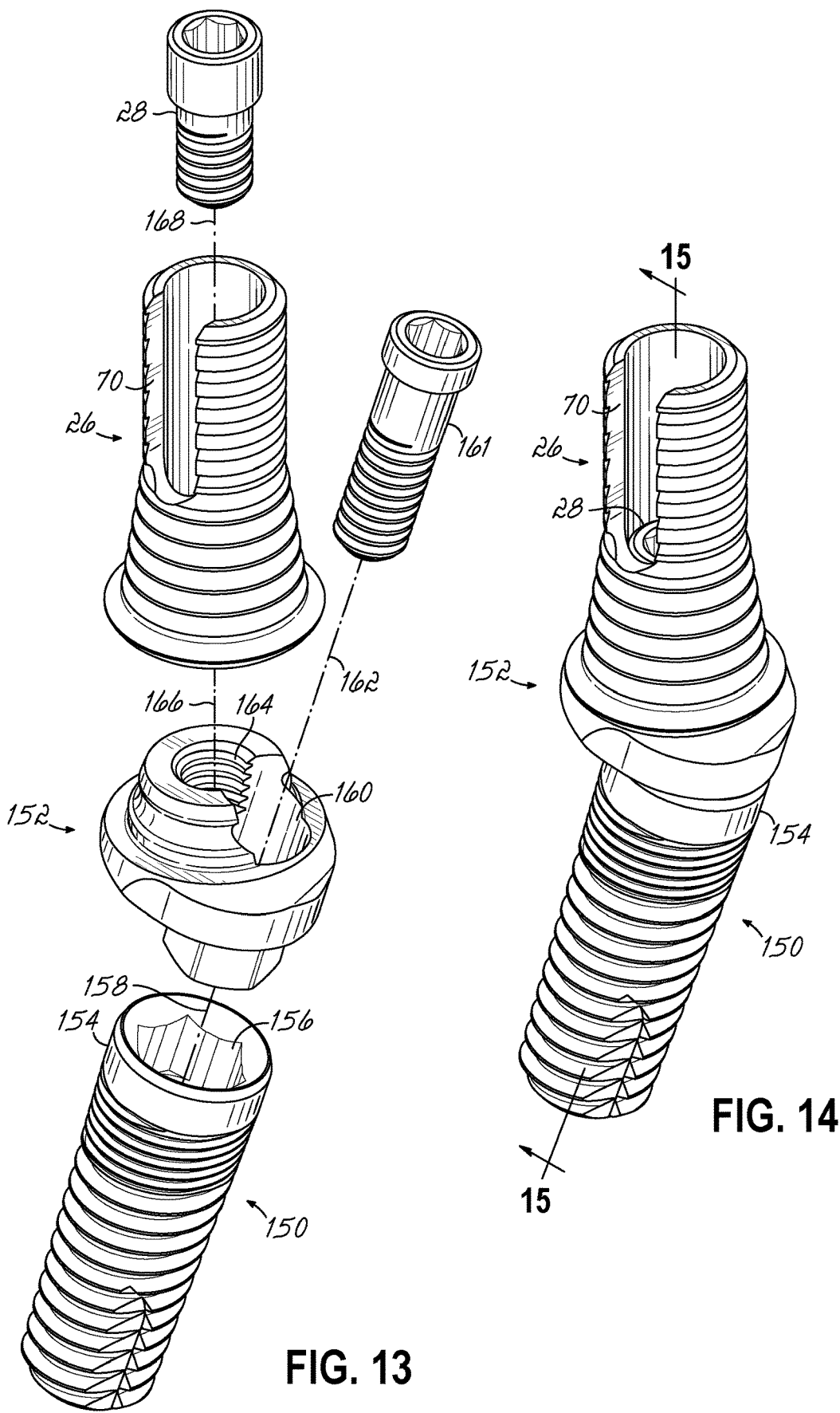
FIG. 13 is a disassembled perspective view illustrating the coupling of a dental assembly with an implant in an angled abutment application.
FIG. 14 is an assembled view of that shown in FIG. 13.
Figure 15:
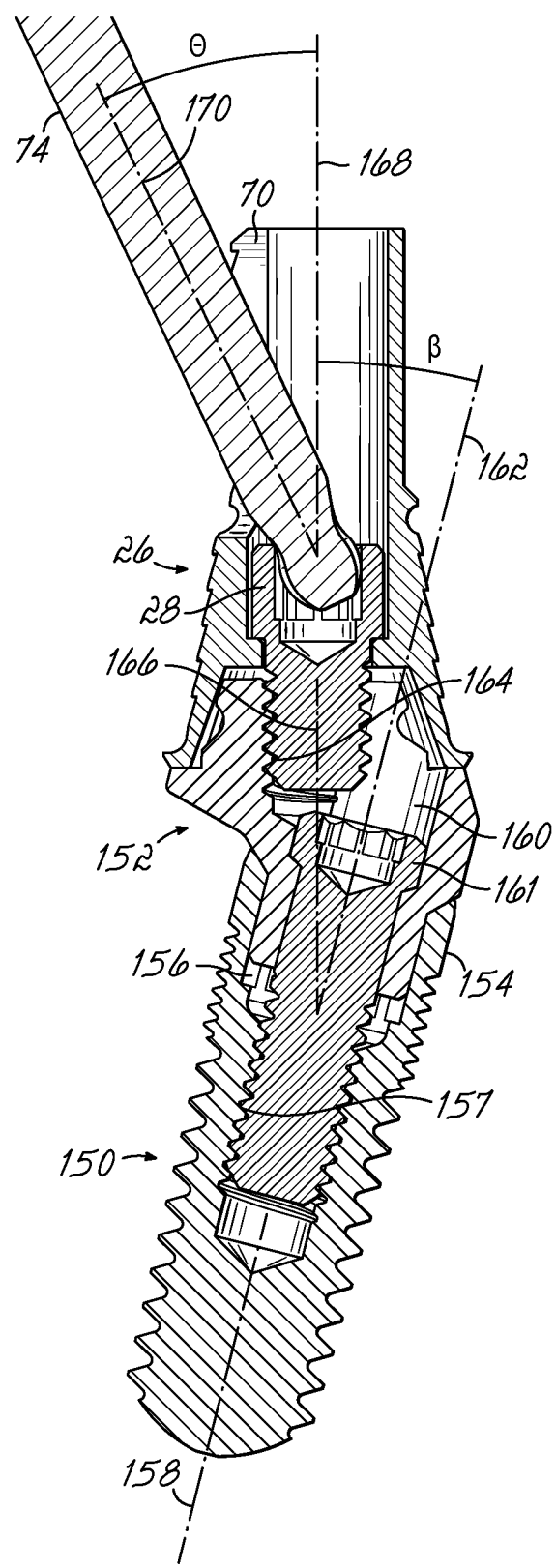
FIG. 15 is a cross section view of the dental assembly shown in FIG. 14 taken along line 15-15.

FIGS. 13-15 schematically demonstrates another exemplary use of a dental assembly 20 having a cylinder 26 with a slot 70. In this application, an implant 150 is positioned within the jaw of a patient in the typical manner and an angled abutment 152 is used to couple the dental assembly 20 to the implant 150. The use of the slotted cylinder 26 in combination with the angled abutment will increase the angle over which the implant may be inserted into the jaw, as discussed below. The implant 150 includes a coronal region 154 having a screw-receiving bore 156 with internal threads 157 configured to receive a fixation screw 161 to secure the abutment 152 to the implant 150. The implant 150 may be positioned in the patient at a desired angle so as to generally define an implant axis 158. The abutment 152 includes a distal bore 160 configured to receive a fixation screw that is received in the bore 156 of the implant 150. The distal bore 160 defines a bore axis 162 that generally aligns with and is parallel to the implant axis 158. The abutment 152 further includes a proximal screw-receiving bore 164 configured to receive a fixation screw 28. The proximal bore 164 defines a bore axis 166. The bore axes 162 and 166 have a non-parallel relationship and intersect at an angle θ. The cylinder 26 of the dental assembly 20 may be coupled to the abutment 152. For sake of clarity, the cylinder 26 of the dental assembly 20 is shown without the base 22 or the teeth 24 illustrated. In any event, the cylinder 26 is positioned within the dental assembly 20 such that when the dental assembly is positioned within the oral cavity, the cylinder axis 168 is generally aligned and parallel to the proximal bore axis 166. At this point, from the inside of the mouth and occlusal side 38 of the dental assembly 20, the dental practitioner may insert the access tool or driver 74, which may be a ball-point hex driver for example, through the access channel 42 in the dental assembly 20 so as to gain access to the first cavity 64 of the cylinder 26 where the fixation screw 28 resides. The driver 74 may be rotated so as to engage the fixation screw 28 to the internal threads in the abutment 152.

As demonstrated in the figures, the angle at which the driver 74 engages the fixation screw 28 does not have to be parallel to the cylinder axis 168. Due to the presence of the slot 70 in the cylinder 26, the driver 74 may engage the fixation screw 28 along an axis 170 that is angled relative to the proximal abutment axis 166. By way of example and without limitation, the driver axis 140 and the abutment axis 136 may include an angle θ between approximately 5 degrees and about 25 degrees. When used in conjunction with the angled abutment 152. The difference in angle between implant axis 158 and the driver axis is the sum of the angle β provided by the abutment and the angle θ provided by the slotted cylinder 26. These off-axis features make the coupling of the dental assembly 20 to the implants in the oral cavity easier, especially when the implant 150 is angled relatively high when placed in the jaw.

In the description provided above, the cylinders 26 included a groove 50 that allowed the cylinders 26 to have two different sizes depending on the particular application. The size of the cylinders may be selected during the digital workflow process described above such that bores are formed in the manufactured prosthesis corresponding to the selected size of the cylinders. A technician would then either secure a full height cylinder within a bore in the prosthesis or cut the cylinder at the groove and then secure the reduced size cylinder within the appropriate bore in the prosthesis. In a further aspect, a similar process may be utilized as it relates to abutments. FIGS. 16-19 illustrate this concept as it applies to an abutment and an associated dental assembly.

Figure 16:
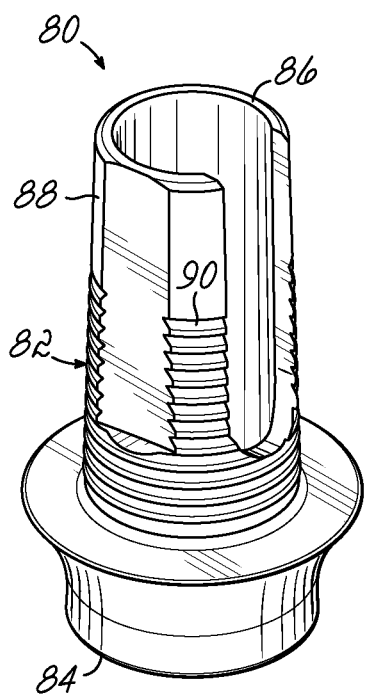
FIG. 16 illustrates a perspective view of an abutment having a first size.
Figure 17:
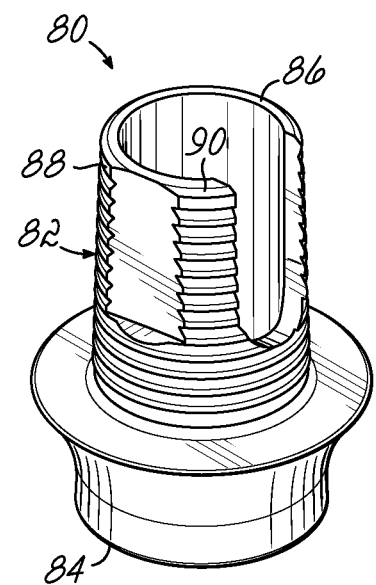
FIG. 17 illustrates a perspective view of the abutment shown in FIG. 16 but having a second size.

FIGS. 16 and 17 illustrate an abutment 80 having two different sizes (e.g., heights) in accordance with an embodiment of the invention. The abutment 80 includes a cylindrical body 82 having a first apical end 84 and a second coronal end 86. The apical end 84 is configured to engage with an implant secured within the oral cavity, and the coronal end is configured to couple to a prosthesis, as is more fully discussed in co-owned U.S. application Ser. No. 15/281,550. In an exemplary embodiment, at least a portion of the outer surface 88 of the cylindrical body 82 includes perturbations that facilitate the coupling of the abutment 80 to the prosthesis. By way of example and without limitation, in one embodiment, the outer surface 88 of the cylindrical body 82 may include one or more saw-tooth annular channels 46 that define undercuts 48 as described above. The annular channels 46 may be provided for the entire length of the abutment 80.

However, in an exemplary embodiment, the perturbations may stop short of the coronal end 86 such that there are no perturbations for a length of the abutment 80. Similar to the above, the last annular channel 90 on the outer surface 88 of the abutment 80 may represent a line of demarcation to a technician for cutting or otherwise separating the abutment 80 at the line of demarcation 90 to provide different sizes. This is similar to the groove 50 described above. In this regard, the last annular channel 90 provides a visual indicator of how much of the abutment 80 should be removed in order to provide the abutment with a reduced height. In this way, the abutment 80 may be transformed quickly and easily for use in different applications requiring abutments of different sizes. For example, a dental assembly in one embodiment may include one or more abutments having a full height (FIG. 16), and one or more abutments having a reduced height (FIG. 17). For the reduced height abutments, a technician may simply cut or otherwise separate an abutment at the last annular channel 90 so as to be at the reduced height.

Aspects of the invention are not limited to non-engaging abutments, as illustrated in FIGS. 16 and 17. In this regard, FIG. 18, in which similar reference numbers refer to similar features, illustrates an engaging abutment 92 having a cylindrical body 94 with a first apical end 84 and a second coronal end 86. The apical end 84 includes a depending member 96 extending downwardly from a seat 98 of the abutment 92. The depending member 96 is configured to be received within the bore of the implant to which the abutment 92 is coupled. Similar to the above, the outer surface 88 of the cylindrical body 94 includes perturbations that facilitate the coupling of the abutment 80 to the prosthesis. More particularly, the last annular channel 90 on the outer surface 88 of the abutment 92 may represent a line of demarcation to a technician for cutting or otherwise separating the abutment 92 at the line of demarcation 90 to provide different sizes. In this regard, the last annular channel 90 provides a visual indicator of how much of the abutment 92 should be removed in order to provide the abutment with a reduced height. In this way, the abutment 92 may be transformed quickly and easily for use in different applications requiring abutments of different sizes.

Figure 18:
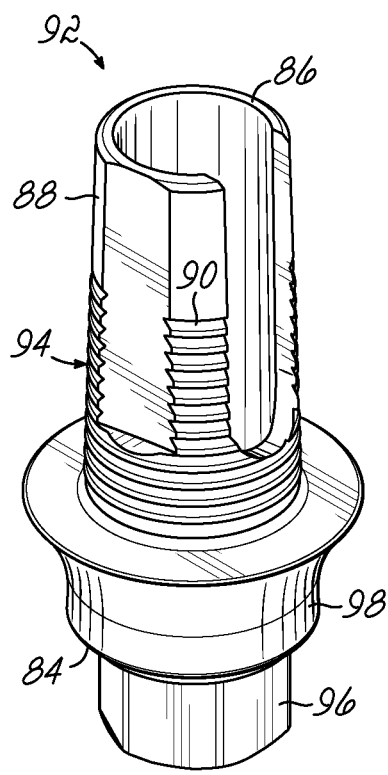
FIG. 18 illustrates a perspective view of another abutment.
Figure 19:
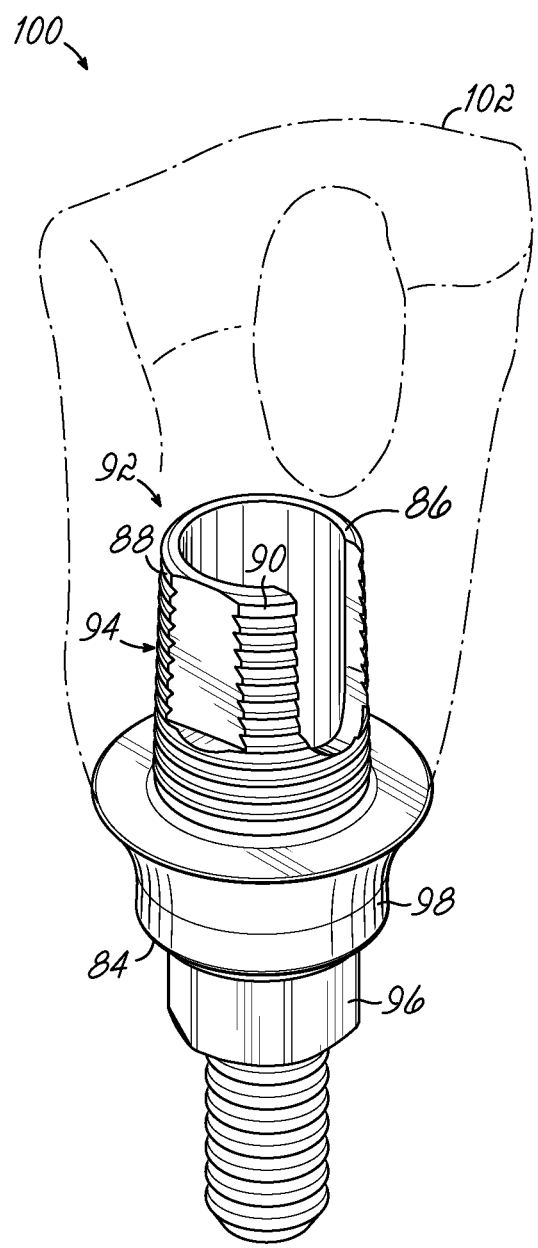
FIG. 19 illustrates a dental assembly having an abutment as described herein.

FIG. 19 illustrates a dental assembly 100 including a prosthesis 102 (shown in phantom) and an abutment 92 having a reduced height (i.e., compare to the height of the abutment in FIG. 18). In an exemplary embodiment, the dental assembly 100 may be formed using a digital workflow procedure, similar to that described above. In this regard, a dental professional conducts an intro-oral or impression scan using digital impression techniques. The data thus generated is imported into software that determines a number of features, including implant design and abutment design. The software also designs the prosthesis including the desired off-axis access channel. In this regard, a computer model of the implants and the abutments (abutment 92 in the embodiment illustrated) is combined with a computer model of a prosthesis. When designing the dental assembly 100 digitally in the software, the height of the abutment 92 may be appropriately selected depending on the application. As noted above, the abutment 92 includes a demarcation line 90 that selectively provides two heights of the abutment 92. The software may include a library for each of the possible heights of the abutment 92. The libraries that form part of the software then define the internal boundaries of a bore that is made during manufacturing of the prosthesis 102 such that when the prosthesis 102 is completed, the bores formed therein are configured to receive abutments 92 with the selected height. If the prosthesis is designed to have a bore with internal boundaries configured to receive an abutment of a reduced height, as is the case in the illustrated embodiment, then once the prosthesis 102 is made according to the design, a technician may cut or otherwise separate an abutment 92 at the demarcation line 90 to thereby provide an abutment that corresponds to the internal boundaries of the bore(s) formed in the prosthesis 102. The technician may then secure the reduced height abutment within the respective bore(s) in the prosthesis 102, through bonding for example, to form the dental assembly 100.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A dental assembly, comprising:
    a prosthesis including a gingival portion and a plurality of artificial teeth, the gingival portion defining a base surface; and
    at least one connecting element coupled to the prosthesis and configured to facilitate coupling of the dental assembly to a patient's oral cavity,
    wherein the at least one connecting element comprises a body having a first end, a second end, and a passageway extending between the first and second ends, the connecting element further comprising an opening through a sidewall of the body that is open to the passageway, the first end is buried within the prosthesis and the second end is substantially flush with or recessed within the prosthesis from the base surface and is configured to receive a portion of an implant or a portion of an abutment positioned in the patient's oral cavity in the passageway,
    wherein the prosthesis comprises a denture or a bridge,
    wherein the prosthesis includes an access channel that opens to an outer surface of the prosthesis and that opens to the passageway of the at least one connecting element, and
    wherein the access channel has a cross dimension that is less than a cross dimension of the passageway of the at least one connecting element adjacent the opening.

2. The dental assembly according to claim 1, wherein the prosthesis includes an anterior region and a posterior region, wherein the at least one connecting element is in the posterior region.

3. The dental assembly according to claim 1, wherein the plurality of artificial teeth define an occlusal side of the prosthesis and the access channel opens to the occlusal side of the prosthesis.

4. The dental assembly according to claim 1, wherein the access channel intersects the opening in the sidewall of the body.

5. The dental assembly according to claim 1, wherein the at least one connecting element defines a central axis, and wherein the access channel defines a channel axis that forms an acute angle relative to the central axis.

6. The dental assembly according to claim 1, further comprising a fixation screw that is movable within the at least one connecting element, and wherein the fixation screw is movable relative to the at least one connecting element and is prevented from separating from the dental assembly once the dental assembly is assembled.

7. The dental assembly according to claim 6, wherein the fixation screw is encased within the connecting element.

8. The dental assembly according to claim 1, wherein the body includes an outer surface having an annular groove positioned between the first and second ends.

9. The dental assembly according to claim 8, wherein the outer surface of the body includes one or more saw-tooth annular channels that define undercuts.

10. The dental assembly according to claim 8, wherein the groove is positioned from the second end between about 20% and about 50% of a length of the body.

11. The dental assembly according to claim 8, wherein the body has a tapered configuration from the second end to the annular groove, and the outermost diameter of the body is greatest at the second end and decreases in a direction toward the annular groove.

12. The dental assembly according to claim 11, wherein the outermost diameter of the body is substantially constant from the annular groove to the first end of the body.

13. The dental assembly according to claim 1, further comprising at least one implant configured to be positioned in the jaw of the patient.

14. The dental assembly according to claim 13, further comprising at least one abutment configured to be coupled to the at least one implant.

15. The dental assembly according to claim 14, wherein the abutment is an angled abutment.

16. The dental assembly according to claim 1, further comprising a fixation screw within the passageway of the at least one connecting element, wherein the access channel has an internal cross dimension sized to allow a driver to pass therethrough and to prevent the fixation screw from passing therethrough.

17. The dental assembly according to claim 1, further comprising a fixation screw within the passageway of the at least one connecting element, wherein the access channel has an internal cross dimension less than an external cross dimension of a head of the fixation screw.

18. The dental assembly according to claim 1, wherein the body includes an annular lip extending radially inward between the first end and the second end to define a first cavity and a second cavity in the passageway, the first cavity being configured to receive a fixation screw and the second cavity being configured to receive the portion of the implant or the portion of the abutment.

19. A dental assembly, comprising:
    a prosthesis including a gingival portion, one or more artificial teeth extending from the gingival portion, and an access channel open to an outer surface of the prosthesis, the gingival portion defining a base surface of the prosthesis;
    at least one connecting element having a sidewall defining a passageway extending from a first end to a second end and an opening through the sidewall so that the passageway is in communication with the access channel through the opening, the first end being in the prosthesis toward the one or more artificial teeth and the second end is adjacent the base surface; and
    a fixation screw in the passageway that is movable to couple the dental assembly to a patient's oral cavity,
    wherein the opening through the sidewall is sized to permit a driver to pass through the opening and to access the fixation screw in the passageway and sized to prevent the fixation screw from passing through the opening.

20. The dental assembly according to claim 19, wherein the second end of the at least one connecting element is substantially flush with or recessed below the base surface of the gingival portion.

21. The dental assembly according to claim 19, wherein the access channel has a cross dimension that is less than a cross dimension of the passageway of the at least one connecting element adjacent the opening.

22. A dental assembly, comprising:
- a prosthesis including a gingival portion, one or more artificial teeth extending from the gingival portion, and an access channel open to an outer surface of the prosthesis, the gingival portion defining a base surface of the prosthesis; and
- at least one connecting element having a sidewall defining a passageway extending from a first end to a second end and an opening through the sidewall so that the passageway is in communication with the access channel through the opening, the first end being in the prosthesis toward the one or more artificial teeth and the second end being adjacent the base surface;
- wherein the at least one connecting element comprises a body having a first end and a second end, the first end is buried within the prosthesis and the second end is substantially flush with or recessed within the prosthesis from the base surface and is configured to receive a portion of an implant or a portion of an abutment positioned in the patient's oral cavity in the passageway, and
- wherein the access channel has a cross dimension that is less than a cross dimension of the passageway of the at least one connecting element adjacent the opening.

23. The dental assembly according to claim 22, wherein the passageway is configured to receive a fixation screw for attachment of the connecting element to an implant and the opening is sized to prevent the fixation screw from passing through the opening.

24. A dental assembly, comprising:
- a prosthesis including a gingival portion and a plurality of artificial teeth, the gingival portion defining a base surface;
- at least one connecting element coupled to the prosthesis and configured to facilitate coupling of the dental assembly to a patient's oral cavity; and
- a fixation screw in the at least one connecting element,
- wherein the at least one connecting element comprises a body having a first end, a second end, and a passageway extending between the first and second ends and receiving the fixation screw, the connecting element further comprising an opening through a sidewall of the body that is open to the passageway, the first end is buried within the prosthesis and the second end is substantially flush with or recessed within the prosthesis from the base surface and is configured to receive a portion of an implant or a portion of an abutment positioned in the patient's oral cavity in the passageway,
- wherein the prosthesis comprises a denture or a bridge,
- wherein the prosthesis includes an access channel open to a side of the prosthesis and open to the passageway, and
- wherein the access channel has an internal cross dimension less than an external cross dimension of a head of the fixation screw.

25. The dental assembly according to claim 24, wherein the opening is sized to prevent the fixation screw from passing through the opening.

* * * * *